United States Patent
Jougo (10) Patent No.: US 8,474,983 B2
(45) Date of Patent: Jul. 2, 2013

(54) LIGHT-SOURCE COOLING DEVICE AND PROJECTION DISPLAY DEVICE PROVIDED WITH SAME

(75) Inventor: Shinichirou Jougo, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 275 days.

(21) Appl. No.: 12/733,615

(22) PCT Filed: Nov. 19, 2008

(86) PCT No.: PCT/JP2008/070996
§ 371 (c)(1),
(2), (4) Date: Mar. 11, 2010

(87) PCT Pub. No.: WO2009/066682
PCT Pub. Date: May 28, 2009

(65) Prior Publication Data
US 2010/0201955 A1 Aug. 12, 2010

(30) Foreign Application Priority Data
Nov. 21, 2007 (JP) ................................ 2007-301521

(51) Int. Cl.
G03B 21/18 (2006.01)
G03B 21/26 (2006.01)
G03B 21/16 (2006.01)
F21V 7/20 (2006.01)

(52) U.S. Cl.
USPC .............................. 353/61; 353/58; 362/345

(58) Field of Classification Search
USPC .................. 353/57, 58, 60, 61; 362/373, 345, 362/294; 352/202; 348/748
See application file for complete search history.

(56) References Cited

U.S. PATENT DOCUMENTS

| 7,331,677 B2 | 2/2008 | Horiguchi et al. |
| 7,540,633 B2 | 6/2009 | Nishimura et al. |
| 2003/0020884 A1* | 1/2003 | Okada et al. .................... 353/57 |
| 2006/0227555 A1 | 10/2006 | Nishimura et al. |

(Continued)

FOREIGN PATENT DOCUMENTS

| CN | 1845005 A | 10/2006 |
| JP | 9-304835 A | 11/1997 |

(Continued)

OTHER PUBLICATIONS

Chinese Office Action dated Oct. 25, 2011, with English translation.

(Continued)

*Primary Examiner* — William C Dowling
*Assistant Examiner* — Ryan Howard
(74) *Attorney, Agent, or Firm* — McGinn IP Law Group, PLLC (57) ABSTRACT

A light-source cooling device is provided that, without adopting a complex configuration, is capable of reducing the temperature difference between the top portion and bottom portion of a light source despite change of the installation orientation. The light-source cooling device of the present invention for cooling a light source (11) is provided with: two ventilation ducts (4 and 5) for guiding cooling airflows (13*a* and 13*b*) to strike against the light source (11) from opposite directions, and two fans (2 and 3) for impelling the cooling airflows (13*a* and 13*b*) to two airflow guide units (4 and 5).

15 Claims, 8 Drawing Sheets

U.S. PATENT DOCUMENTS

| | | | |
|---|---|---|---|
| 2007/0046904 A1* | 3/2007 | Rudolph et al. | 353/85 |
| 2007/0115436 A1* | 5/2007 | Takeda et al. | 353/57 |
| 2008/0231812 A1* | 9/2008 | Sakai et al. | 353/58 |

FOREIGN PATENT DOCUMENTS

| | | |
|---|---|---|
| JP | 10-23355 A | 1/1998 |
| JP | 2001-76505 A | 3/2001 |
| JP | 2002-298639 A | 10/2002 |
| JP | 2002-352604 A | 12/2002 |
| JP | 2004-164999 A | 6/2004 |
| JP | 2006-91132 A | 4/2006 |
| JP | 2006-91610 A | 4/2006 |
| JP | 2006-294299 A | 10/2006 |
| JP | 2007-59641 A | 3/2007 |

OTHER PUBLICATIONS

Japanese Office Action dated Jul. 6, 2011, with partial English translation.

European Search Report dated Feb. 7, 2011.

Chinese Office Action dated Aug. 3, 2012 with English translation thereof.

* cited by examiner

LIGHT-SOURCE COOLING DEVICE AND PROJECTION DISPLAY DEVICE PROVIDED WITH SAME

TECHNICAL FIELD

The present invention relates to light-source cooling of a projection display device provided with a light source.

BACKGROUND ART

Heat generated by lighting of an arc tube rises toward the opposite side of gravity in the arc tube, whereby the surface temperature of the top portion of the arc tube is higher than the bottom portion. The arc tube temperature and arc tube product life are strongly related, and proper management of arc tube temperature is therefore of key importance. To extend the product life of an arc tube, it is important to reduce the temperature difference between the top portion and bottom portion of the arc tube. Accordingly, cooling preferably focuses on the top portion of an arc tube in a state in which a device that is provided with a lamp unit is installed on a floor surface (hereinbelow, a "standing state").

Based on these circumstances, as the cooling means of the arc tube, a device equipped with a lamp unit is provided with one jet such that a cooling airflow is blown against the top portion of the arc tube in a predetermined installation state. With this type of cooling means, however, if the device in the standing state is turned upside down and installed on a ceiling (hereinbelow referred to as a "suspended state"), the cooling airflow from the jet is blown chiefly against the bottom portion of the arc tube, resulting in a problem in which the temperature difference between the top portion and bottom portion of the arc tube is actually increased.

As a technique for solving this problem, a configuration has been proposed in which a cooling airflow guide plate that can move according to the installed state and that can switch the direction of flow of the cooling airflow is provided in the cooling airflow jet such that the cooling airflow is blown against the top portion of the arc tube whether in a standing state or in a suspended state (see JP-A-2006-091132 (hereinbelow referred to as Patent Document 1)).

Although not a technique for solving the problem described above caused by the installation state, JP-A-2002-352604 (hereinbelow referred to as Patent Document 2) discloses the provision of front ventilation ports above and below the front portion of a reflector and the arrangement of a cooling fan to confront each front ventilation port. Cooling air is then introduced to the inner space of the reflector from each front ventilation port to cool a light-source lamp, and the warm air in the inner space of the reflector is then exhausted outside the reflector from a rear ventilation port provided in the rear portion of the reflector.

However, the method disclosed in Patent Document 1 only lowers the temperature of the top portion of the arc tube, and maintaining the temperature of the top portion and bottom portion of the arc tube within a prescribed temperature range still remains a problem. The problem therefore arises that the temperature difference between the upper and bottom portions of the arc tube differs depending on the installation orientation.

Because this is a technology in which the cooling airflow guide plate can be moved according to the installation state of the device, the construction is complex. In addition, the problem arises in which the adherence of extraneous matter to the movable mechanism of the cooling airflow guide plate prevents satisfactory switching of the airflow direction realized by the cooling airflow guide plate.

In Patent Document 2, moreover, there is absolutely no disclosure of the idea of guiding the cooling airflow into the reflector such that the cooling airflow concentrates at the top portion and bottom portion of the light source. On the contrary, paragraphs and of this document describe the effective ventilation of the entire inner space of the reflector with cooling air and the increase of the cooling effect. Accordingly, the invention disclosed in Patent Document 2 is a means for cooling the entire inner space of the reflector and in no way achieves the object of reducing the temperature difference between the top portion and the bottom portion of the light source to extend the product life of the light source.

DISCLOSURE OF THE INVENTION

It is an object of the present invention to provide a light-source cooling device that can solve at least one of the above-described problems. One example of this object is the provision of a light-source cooling device that, without adopting a complex configuration, can reduce the temperature difference between the top portion and bottom portion of the light source despite alterations of the installation position.

One aspect of the present invention is a light-source cooling device for cooling a light source. This device is provided with two airflow guide units for guiding cooling airflows such that the cooling airflows strike the light source from opposite directions; and fans for impelling the cooling airflows toward the two airflow guide units.

The term "top portion" used in the specification and claims refers to the portion that faces towards the direction opposite the direction of gravity, and "bottom portion" refers to the portion that faces towards the direction of gravity.

BRIEF DESCRIPTION OF THE DRAWINGS

FIG. 4 (*a*) is a perspective view of the lamp unit, and (*b*) is a front view of the lamp unit as seen from the light-emission port side of the reflector;

BEST MODE FOR CARRYING OUT THE INVENTION

Embodiments of the present invention are next described with reference to the accompanying drawings. Although examples are here shown in which the light-source cooling device of the present invention is applied to a projection display device (projector), the present invention is not limited to the examples of this application.

First Embodiment

Figure 1:
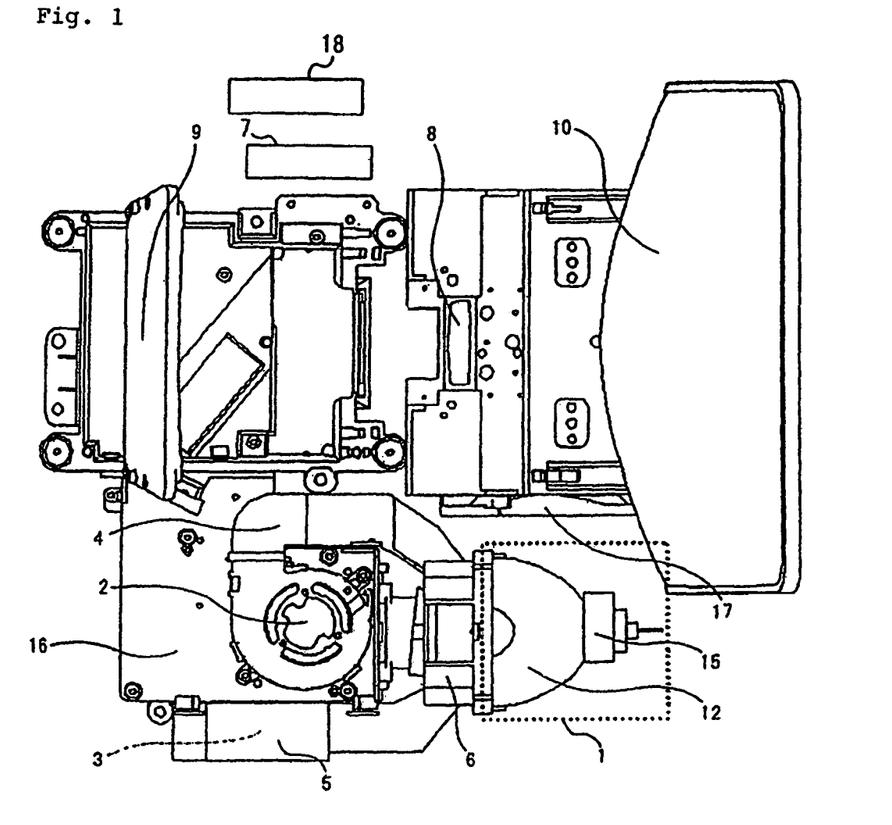
FIG. 1 is an upper plan view showing the principal parts of the projection display device of the first embodiment of the present invention.
Figure 2:
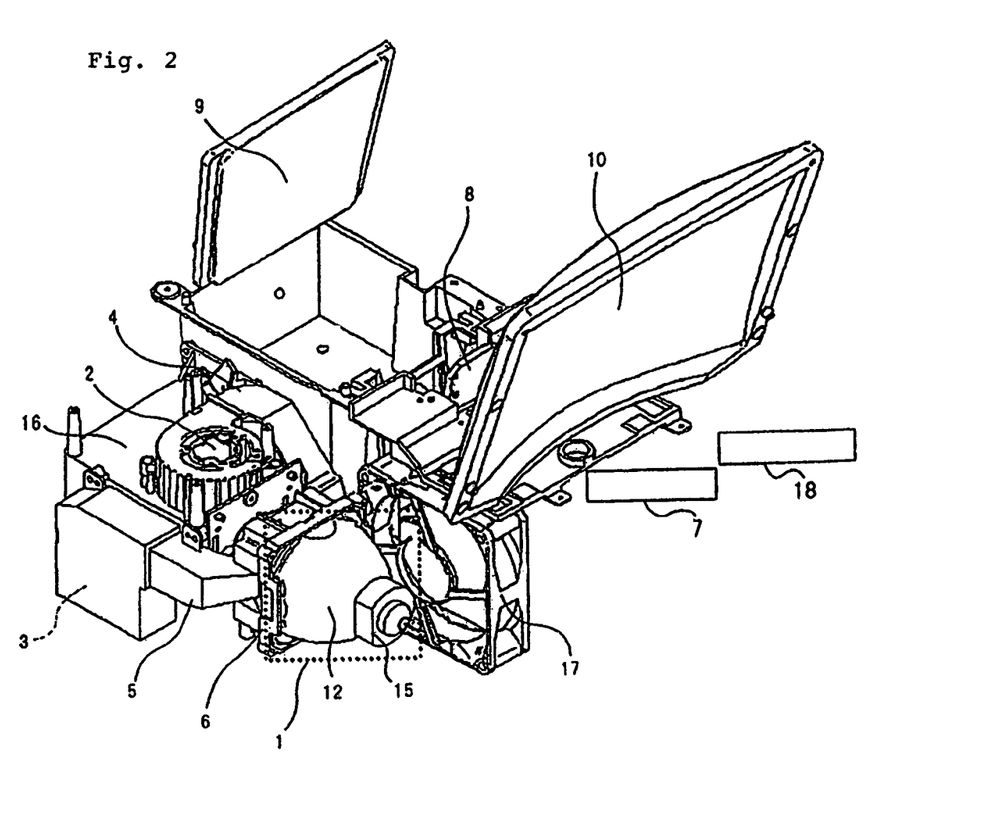
FIG. 2 is a perspective view of the display device of FIG. 1 as seen from the upper rear side of the lamp unit.

FIG. 1 shows a block diagram of the chief constituent parts in a mirror type, ultra-short focal-distance projector that is the projection display device of the first embodiment of the present invention. However, the entirety of the projector is not shown in the figure. FIG. 2 is a perspective view of the chief constituent parts of the projector shown in FIG. 1 as seen from above and behind the lamp unit.

The projection display device of the present embodiment shown in FIG. 1 is provided with: lamp unit 1, lamp holder 6 for holding lamp unit 1, sirocco fans 2 and 3 for which rotational speeds can be altered, and ventilation ducts 4 and 5 for blowing air inside lamp unit 1 from the sirocco fans. This display device is further equipped with: attitude sensor 7 for detecting the orientation of the device, temperature sensor 18 for detecting the ambient temperature (the temperature outside the projection display device), optical engine 16 in which optical components are installed inside, axial flow fan 17 capable of altering the rotational speed for device cooling and cooling lamp unit 1, and projection mirrors 8, 9, and 10 for projecting images.

Three projection mirrors 8, 9, and 10 are shown in the figure, but four projection mirrors are conventionally used. Sirocco fans 2 and 3 and ventilation ducts 4 and 5 are attached to the outside of optical engine 16. Attitude sensor 7 and temperature sensor 18 are not depicted in the figure, but these components may be installed at appropriate locations on the device case (not shown).

As the operation of the above-described display device, light generated by lamp unit 1 passes by way of optical components in optical engine 16, passes by way of projection mirrors 8, 9, and 10, and is projected onto a screen (not shown). Voltage is applied to lamp unit 1 by a control means on a base plate (not shown). Sirocco fans 2 and 3 and axial flow fan 17 are also controlled by this control means. Because the rotational speeds of sirocco fans 2 and 3 and axial flow fan 17 can be changed, the ambient temperature is detected by temperature sensor 18, and the rotational speeds of each of fans 2, 3, and 17 can be altered to rotational speeds that are set to achieve the optimum temperature with respect to the ambient temperature.

This device is equipped with attitude sensor 7 for detecting the installation orientation of the device (the standing state or suspended state). The installation orientation is then detected by attitude sensor 7, and the rotational speed of each of fans 2, 3, and 17 can be altered to rotational speeds that are set to achieve the ideal temperature for the installation orientation.

Figure 3:
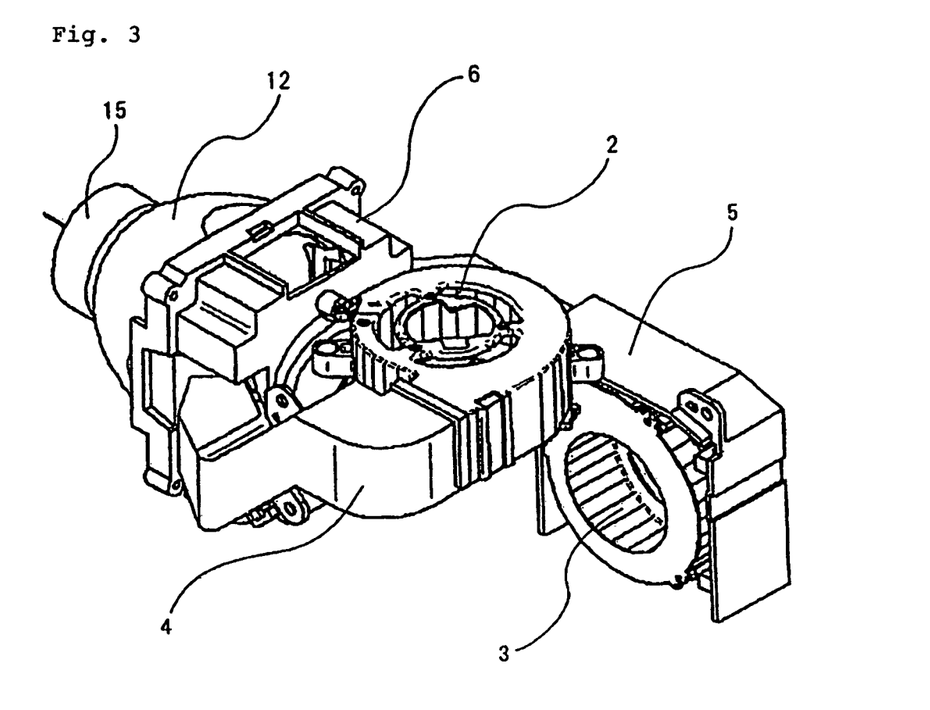
FIG. 3 is a perspective view showing the lamp-cooling device in the first embodiment.

FIG. 3 is a perspective view showing the lamp-cooling device of the present embodiment.

Reflector 12 of lamp unit 1 is supported by lamp holder 6 (reflector holder). The lamp-cooling device for cooling the light source of this type of lamp unit 1 is provided with sirocco fans 2 and 3 for which rotational speeds can be changed for cooling lamp unit 1 and ventilation ducts 4 and 5 for blowing air into lamp unit 1 from each sirocco fan.

Ventilation duct 4 is in a state of contact with the outlet of sirocco fan 2. In addition, the outlet of ventilation duct 4 is linked to the left side (in the figure) of lamp holder 6 (i.e., the left side as seen from the direction of emission of light due to reflector 12) and blows air from this point into lamp unit 1.

Sirocco fan 3 is in a state covered by ventilation duct 5, and the outlet of sirocco fan 3 is arranged inside ventilation duct 5. The outlet of ventilation duct 5 is linked to the end on the right side of lamp holder 6 in the figure, and air is blown from this point into lamp unit 1.

Sirocco fans 2 and 3 that are in an operating state draw air inside optical engine 16, whereby the hot air inside optical engine 16 is discharged to the outside and the optical elements inside optical engine 16 are cooled.

Figure 4:
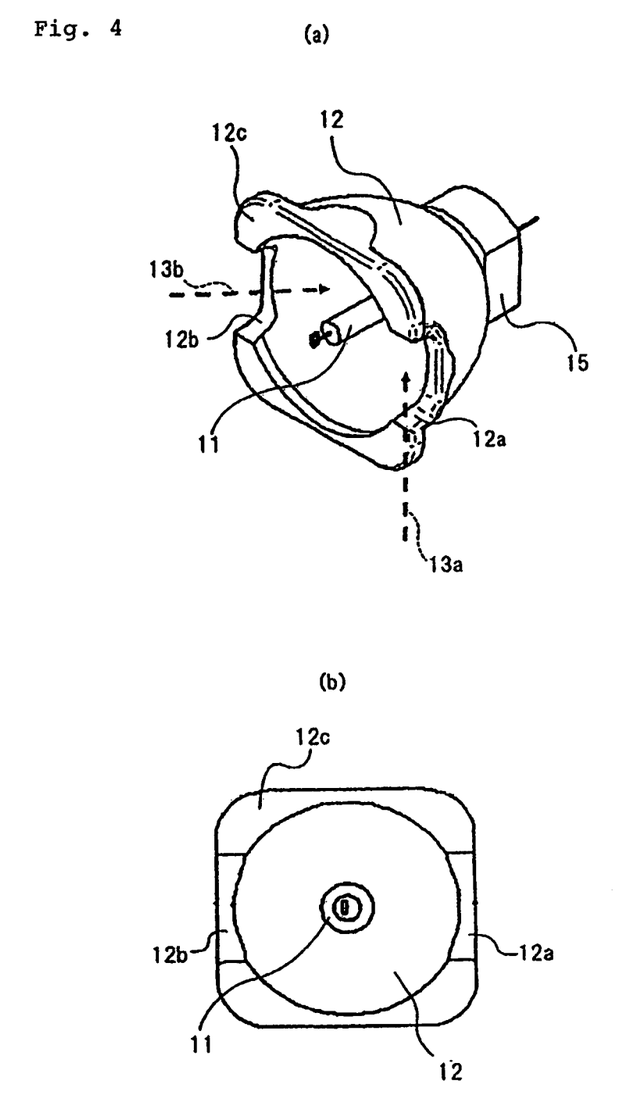

To further describe the details of lamp unit 1, FIG. 4 shows the detailed configuration of lamp unit 1.

Lamp unit 1 is equipped with arc tube 11 that has a generally straight tube shape for emitting light as a light source, reflector 12 for reflecting the luminous flux generated from the light source in any direction, and reflector base 15 for joining arc tube 11 and reflector 12. Arc tube 11 is bonded to reflector 12 by an adhesive by way of reflector base 15 and, by being supplied with electrical power from the outside, generates light.

The inner surface of reflector 12 is composed of a broadly hemispherical form, and further, is processed to be mirror surface. Outer periphery 12c of the light-emission port of reflector 12 is a square shape and includes cutouts 12a and 12b on the right and left sides of this light-emission port for guiding cooling air. Reflector 12 is supported by joining outer periphery 12c of the light-emission port of reflector 12 to lamp holder 6. Two openings (not shown) linked to each of cutouts 12a and 12b of reflector 12 are provided in lamp holder 6 for conveying cooling airflows 13a and 13b to arc tube 11. Ventilation ducts 4 and 5 allow each of the outlets of sirocco fans 2 and 3 to communicate with each opening of lamp holder 6.

For example, when arc tube 11 is what is known as an ultra-high pressure mercury lamp, the application of voltage to electrodes inside arc tube 11 to supply power causes the interior of arc tube 11 to generate light, and arc tube 11 itself becomes extremely hot. As a result, lamp unit 1 entails high temperature.

As a result, cooling airflows 13a and 13b conveyed to lamp unit I by ventilation ducts 4 and 5 are blown against and cool arc tube 11 from cutouts 12a and 12b at opposite directions of reflector 12.

As a characteristic feature of the present invention, two cooling airflows 13a and 13b with separately controlled flow speeds are blown against the top portion and bottom portion of arc tube 11 from opposite directions.

The two airflow guide units that guide air such that cooling airflows 13a and 13b strike the top portion and bottom portion of arc tube 11 have a configuration that includes: ventilation ducts 4 and 5 that are connected to the outlets of sirocco fans 2 and 3, respectively; and openings (hereinbelow referred to as "airflow outlets") provided in lamp holder 6 for directing the cooling air that passes through each ventilation duct to arc tube 11.

Although explained later, the present invention is also characterized by offsets of the flow centers of cooling airflows 13a and 13b toward the top portion and bottom portion of arc tube 11 with respect to the center of arc tube 11 such that the surface temperature of arc tube 11 is made uniform.

The cooling of arc tube 11 is next described.

Figure 5:
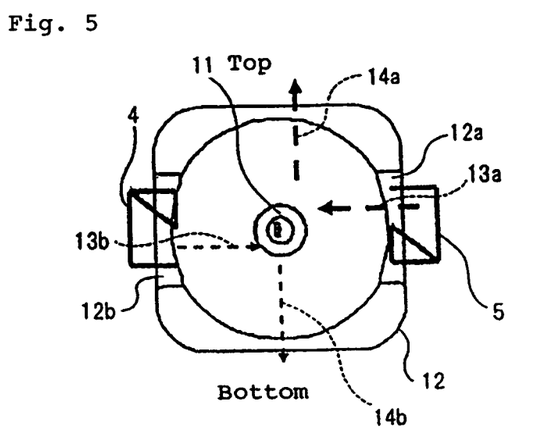
FIG. 5 is a front view of the lamp unit and is shown to explain the relation between the arc tube and the airflow outlets in the two ventilation ducts of the first embodiment.

FIG. 5 shows an example of the positional relation between lamp unit 1 and ventilation ducts 4 and 5, and shows lamp unit 1 as seen from the light-emission port side. In addition, in FIGS. 5-16 described hereinbelow, the bottom and top in the figures coincide with the direction of gravity and the opposite direction, respectively, and the left and right in the figure coincide with the horizontal directions.

Referring to FIG. 5, ventilation duct 5 is arranged at cutout 12a on the right side of reflector 12, and ventilation duct 4 is arranged at cutout 12b on the left side. At right-side ventilation duct 5, the bottom portion of the airflow outlet is closed to supply cooling airflow 13a that intensively cools the top portion and right side portion of arc tube 11. Similarly, at left-side ventilation duct 4, the upper portion of the airflow outlet is closed to supply cooling airflow 13b that intensively cools the bottom portion and left-side portion of arc tube 11. These two airflow outlets are arranged at opposite positions with arc tube 11 interposed.

The heat of arc tube 11 rises in the direction that is opposite gravity, and the surface temperature of the top portion of arc tube 11 is therefore higher than that of the bottom portion. As a result, the location at which the temperature of arc tube 11 reaches a maximum (i.e., the highest point) is at the top portion of arc tube 11. Regarding the performance of a lamp, the product life of arc tube 11 is affected when the temperature reaches its highest level, and the temperature of the location at which the temperature of arc tube 11 is at a minimum level (i.e., the coldest point) exerts an effect on the brightness of the lamp and on stabilized light emission, that is free of flicker.

To obtain the maximum performance of arc tube 11, the coldest point should be raised as much as possible and the highest point should be lowered as much as possible within the optimum temperature range. In other words, the surface temperatures of arc tube 11 are preferably equalized such that the temperature difference between the top portion and bottom portion of arc tube 11 is reduced.

Equalizing the surface temperatures of arc tube 11 therefore requires stronger cooling of the top portion than the bottom portion of arc tube 11.

Because the temperature distribution of arc tube 11 is in the state described above, the flow speed of cooling airflow 13a is made higher than that of cooling airflow 13b, and the rotational speed of sirocco fan 3 is therefore made higher than the rotational speed of sirocco fan 2.

Cooling airflow 13a that strikes against the top portion and right-side portion of arc tube 11 is discharged as exhaust airflow 14a from the top portion of lamp holder 6, and cooling airflow 13b that strikes against the bottom portion and left-side portion of arc tube 11 is discharged as exhaust airflow 14b from the bottom portion of lamp holder 6. These two exhaust portions are in opposite positions with arc tube 11 interposed, but exhaust airflows 14a and 14b are supplied to the outside of the device by axial flow fan 17.

When the installation orientation of the display device changes and the top portion and bottom portion are reversed, the temperature distribution of arc tube 11 also reverses. The display device of the present embodiment is equipped with attitude sensor 7 for detecting the installation orientation of the device (standing state and suspended state), and the installation orientation can therefore be automatically detected by means of this component. As a result, even when the temperature distribution of arc tube 11 is reversed, the optimum temperature of arc tube 11 can be achieved by reversing the strengths of cooling airflows 13a and 13b based on the attitude information from attitude sensor 7. In other words, when the state of FIG. 5 is turned upside down, the flow speed of cooling airflow 13b is raised higher than that of cooling airflow 13a.

In the present embodiment, the temperature difference between the top portion and bottom portion of arc tube 11 was 50° in both the standing state and suspended state. In contrast, when configured by a single cooling fan and a single ventilation duct, the temperature difference between the top portion and bottom portion of the arc tube was 100° in the standing state and 150° in the suspended state.

Because the present embodiment enables a similar reduction of the temperature difference between the top portion and bottom portion of arc tube 11 in both the standing state and the suspended state, the light emission of lamp unit 1 is stable, and moreover, the product life of the light source can be extended regardless of the installation orientation. Still further, because the highest point of arc tube 11 can be intensively cooled, quieter operation can be achieved than when increasing the flow speed with a single cooling fan.

In the present embodiment, if the airflow resistance of each of ventilation ducts 4 and 5 is identical, and moreover, if the intake resistance of each of sirocco fans 2 and 3 is identical, the flow speed of cooling airflows 13a and 13b can be reversed by reversing the rotational speed of each sirocco fan in response to reversing of the installation orientation of the device. However, when these device conditions are difficult to achieve, the rotational speeds of each of sirocco fans 2 and 3 may be each set separately to reverse the flow speeds of cooling airflows 13a and 13b.

In addition, a sensor for detecting orientations other than the standing state and suspended state of the above-described display device may be added. In this way, the temperature of arc tube 11 can be kept substantially uniform by adjusting the fan rotational speeds according to the orientation, as to orientations other than the standing state and suspended state.

Figure 6:
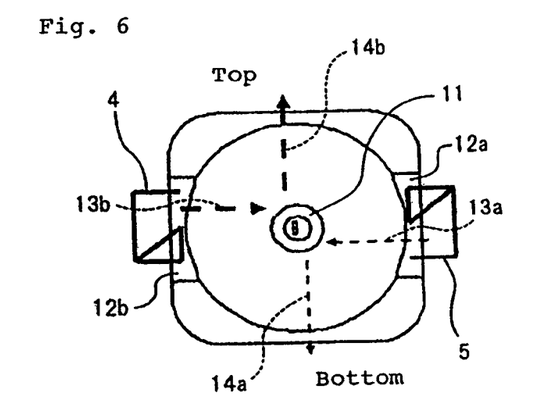
FIG. 6 is a front view of the lamp unit and is shown to explain the relation between the arc tube and the airflow outlets in the two ventilation ducts as a modification of the first embodiment.
Figure 7:
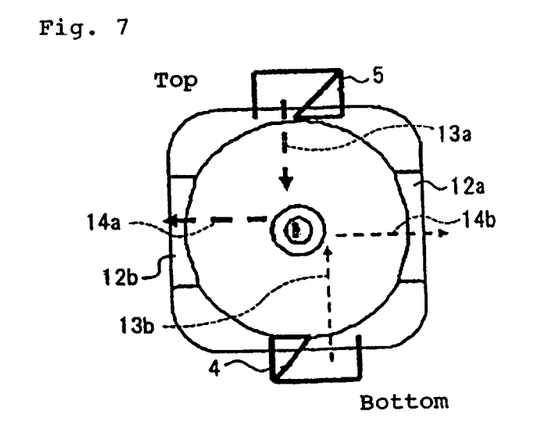
FIG. 7 is a front view of the lamp unit and is shown to explain the relation between the arc tube and the airflow outlets in the two ventilation ducts as a modification of the first embodiment.
Figure 8:
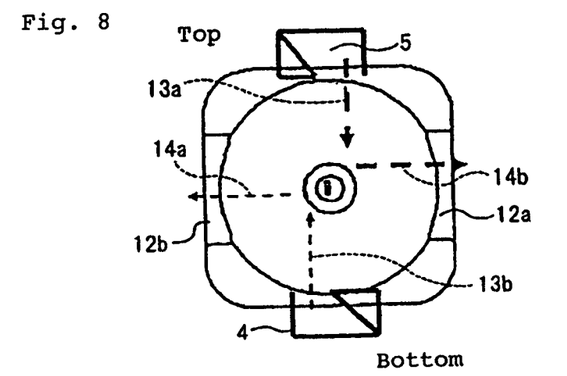
FIG. 8 is a front view of the lamp unit and is shown to explain the relation between the arc tube and the airflow outlets in the two ventilation ducts as a modification of the first embodiment.

FIGS. 6-8 show modifications to the configuration of FIG. 5.

In FIG. 6, the top portion of the airflow outlet at right-side ventilation duct 5 is closed to supply cooling airflow 13a that intensively cools the bottom portion and right-side portion of arc tube 11. Still further, the bottom portion of the airflow outlet is closed at left-side ventilation duct 4 to supply airflow 13b that intensively cools the top portion and left-side portion of arc tube 11. In other words, compared to the configuration of FIG. 5, the directions of blowing the cooling airflows against the top portion and bottom portion of arc tube 11 are reversed at left-side ventilation duct 4 and right-side ventilation duct 5. In addition, cooling airflow 13b is made stronger than cooling airflow 13a.

In this way, the example of FIG. 6 obtains an effect equivalent to that of FIG. 5 if the rotational speeds of sirocco fans 2 and 3 are changed to reverse the airflow speeds at the airflow outlets.

In FIG. 7, instead of arranging two ventilation ducts 4 and 5 corresponding to cutouts 12a and 12b of reflector 12, ventilation ducts 4 and 5 are arranged at the top portion and bottom portion of reflector 12 and/or lamp holder 6 (not shown in FIG. 7). The right-side portion of the airflow outlet is closed at upper ventilation duct 5, and the left-side portion of the airflow outlet is closed at lower ventilation duct 4.

In other words, in the example of FIG. 7, cooling airflow 13a from upper ventilation duct 5 cools the top portion and left-side portion of arc tube 11, becomes exhaust airflow 14a, and is discharged from cutout 12b on the left side of reflector 12. Cooling airflow 13b from lower ventilation duct 4 cools the bottom portion and right side portion of arc tube 11, becomes exhaust airflow 14b, and is discharged from cutout 12a on the right side of reflector 12. Compared to the configuration of FIG. 5, the positions of ventilation ducts 4 and 5 have changed but the strength and effect of the cooling airflows are the same as the example of FIG. 5. In addition, this configuration can be handled by altering the shape of lamp holder 6.

The example of FIG. 8 is a case of altering the supply of cooling airflows 13a and 13b from the airflow outlets at each of ventilation ducts 5 and 4 of FIG. 7. Specifically, in the configuration of FIG. 8, the left-side portion of the airflow outlet is closed at upper ventilation duct 5, whereby cooling airflow 13a from ventilation duct 5 cools the top portion and right-side portion of arc tube 11. In addition, the right-side portion of the airflow outlet is closed at lower ventilation duct 4, whereby cooling airflow 13b from ventilation duct 4 cools the bottom portion and the left-side portion of arc tube 11.

In this example, the duct allotted to the top portion of arc tube 11 is unchanged from the example of FIG. 7, and the strengths of cooling airflows 13a and 13b are the same as the example of FIG. 7. As a result, the effect obtained is equivalent to that of the example of FIG. 7.

Second Embodiment

FIGS. 9-12 show the second embodiment of the present invention. The present embodiment is an application of the configuration of FIGS. 1-4 that was described in the first embodiment, and differs regarding the shape of the two airflow guide units for implementing guiding such that cooling airflows 13a and 13b strike against arc tube 11.

Figure 9:
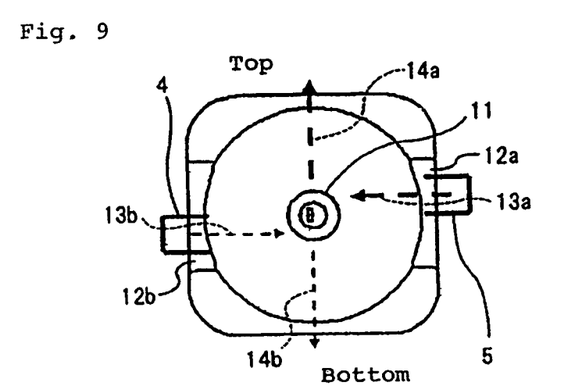
FIG. 9 is a front view of the lamp unit and is shown to explain the relation between the arc tube and the airflow outlets in the two ventilation ducts of the second embodiment.

In FIG. 9, ventilation duct 5 is arranged on the upper side of right-side cutout 12a of reflector 12, whereby the airflow outlet in ventilation duct 5 is offset upwards with respect to the center of arc tube 11, and cooling airflow 13a that intensively cools the top portion and right-side portion of arc tube 11 is supplied from the airflow outlet. In addition, ventilation duct 4 is arranged in the lower portion of left-side cutout 12b of reflector 12, whereby the airflow outlet in ventilation duct 4 is offset downward with respect to the center of arc tube 11, and cooling airflow 13b that intensively cools the bottom portion and left-side portion of arc tube 11 is supplied from the airflow outlet.

In this configuration, instead of blocking a portion of each airflow outlet as in FIG. 5, each airflow outlet itself is made smaller by reducing the size of the shape of the ventilation duct. However, compared to the configuration of FIG. 5, only the shape of ventilation ducts 4 and 5 is changed, and an equivalent effect is therefore obtained by means of the same fan control as in the example of FIG. 5. In addition, only the shape of lamp holder 6 need be changed to conform to the shape of ventilation ducts 4 and 5.

Figure 10:
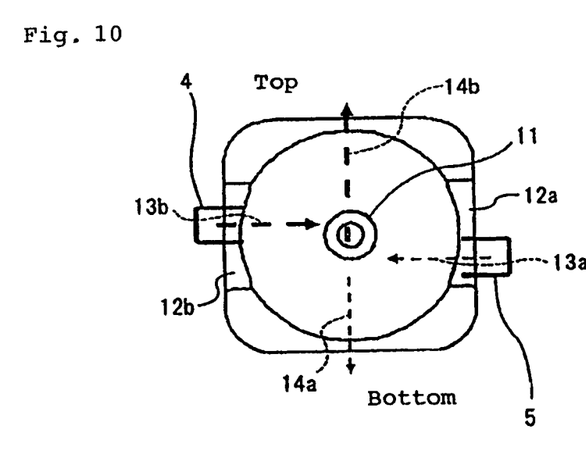
FIG. 10 is a front view of the lamp unit and is shown to explain the relation between the arc tube and the airflow outlets in the two ventilation ducts as a modification of the second embodiment.

In the example of FIG. 10, the directions from which the cooling airflows blow against the top portion and bottom portion of arc tube 11 are reversed from the configuration of FIG. 9 by left-side ventilation duct 4 and right side ventilation duct 5. Specifically, ventilation duct 5 is arranged at the lower portion of right-side cutout 12a of reflector 12, whereby the bottom portion and right-side portion of arc tube 11 is intensively cooled. In addition, ventilation duct 4 is arranged on the upper side of left-side cutout 12b of reflector 12, whereby the top portion and left-side portion of arc tube 11 are intensively cooled. In regard to the rotational speed control of the cooling fans, cooling airflow 13b is made stronger than cooling airflow 13a as a result of this configuration.

Figure 11:
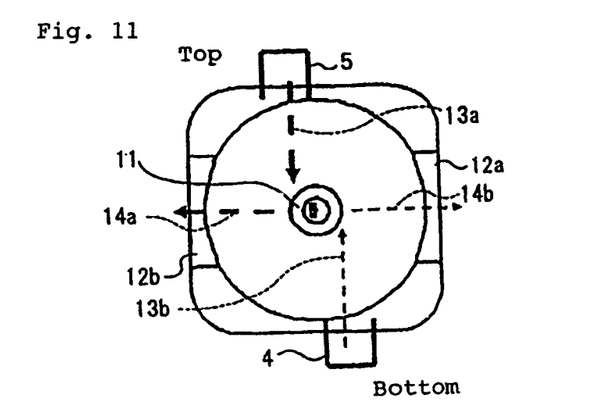
FIG. 11 is a front view of the lamp unit and is shown to explain the relation between the arc tube and the airflow outlets in the two ventilation ducts as a modification of the second embodiment.

In FIG. 11, the two ventilation ducts 4 and 5 are not arranged to correspond to right and left cutouts 12a and 12b of reflector 12, but rather, are arranged in the top portion and bottom portion of reflector 12 and/or lamp holder 6 (not shown in FIG. 11). Cooling airflow 13a from the airflow outlet at upper ventilation duct 5 is offset to the left side with respect to the center of arc tube 11, and cooling airflow 13b from the airflow outlet at lower ventilation duct 4 is offset toward the right side with respect to the center of arc tube 11.

In other words, cooling airflow 13a from upper ventilation duct 5 in the example of FIG. 11 cools the top portion and left-side portion of arc tube 11, becomes exhaust airflow 14a, and is discharged from left-side cutout 12b of reflector 12. Cooling airflow 13b from lower ventilation duct 4 cools the bottom portion and right-side portion of arc tube 11, becomes exhaust airflow 14b, and is discharged from right-side cutout 12a of reflector 12. Although the positions of ventilation ducts 4 and 5 are changed compared to the configuration of FIG. 9, the strengths and effect of the cooling airflows are the same as the example of FIG. 9.

Figure 12:
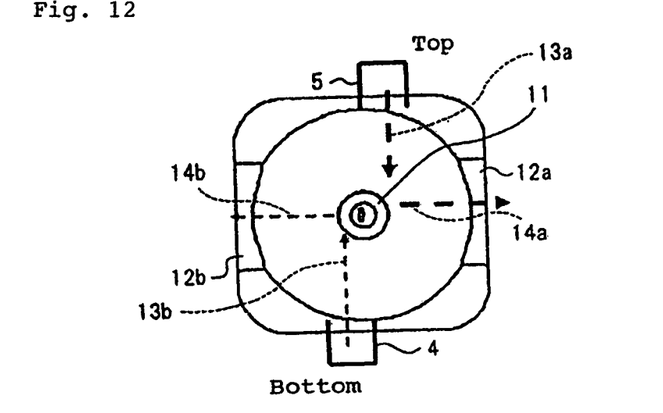
FIG. 12 is a front view of the lamp unit and is shown to explain the relation between the arc tube and the airflow outlets in the two ventilation ducts as a modification of the second embodiment.

The example of FIG. 12 is a case in which the arrangement of the position of each ventilation duct 5 and 4 of FIG. 11 is changed to alter the positions of the airflow outlets. In other words, at upper ventilation duct 5 in FIG. 12, the airflow outlet is offset to the right with respect to the center of arc tube 11, and at lower ventilation duct 4, the airflow outlet is offset to the left with respect to the center of arc tube 11. As a result, cooling airflow 13a from ventilation duct 5 cools the top portion and right-side portion of arc tube 11, becomes exhaust airflow 14a, and is discharged from right-side cutout 12a of reflector 12. Cooling airflow 13b from ventilation duct 4 cools the bottom portion and left-side portion of arc tube 11, becomes exhaust airflow 14b, and is discharged from left-side cutout 12b of reflector 12.

In this example, the duct allotted to the top portion of arc tube 11 is unchanged from the example of FIG. 11, and the power of cooling airflows 13a and 13b are therefore the same as in the example of FIG. 11. As a result, an effect equivalent to that of the example of FIG. 11 is obtained.

Third Embodiment

Next, FIGS. 13-16 show the third embodiment of the present invention. The present embodiment is an application of the configuration of FIGS. 1-4 described in the first embodiment, but differs regarding the shapes and positions of the two airflow guide units that effect guiding such that cooling airflows 13a and 13b are blown against arc tube 11.

Figure 13:
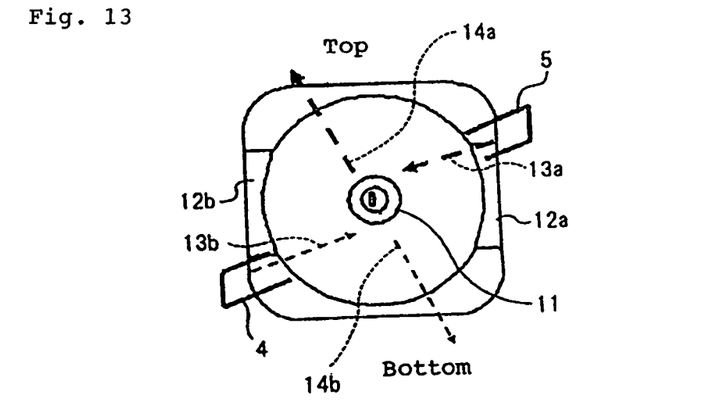
FIG. 13 is a front view of the lamp unit and is shown to explain the relation between the arc tube and the airflow outlets in the two ventilation ducts of the third embodiment.

In FIG. 13, ventilation duct 5 is arranged above the upper side of right-side cutout 12a of reflector 12. The airflow outlet in ventilation duct 5 is then configured such that cooling airflow 13a is blown intensively against the top portion and right-side portion of arc tube 11. On the other hand, ventilation duct 4 is arranged below the lower portion of left-side cutout 12b of reflector 12. The airflow outlet at ventilation duct 4 is then configured such that cooling airflow 13b is intensively blown against the bottom portion and left-side portion of arc tube 11.

This configuration can be achieved by altering the shape of lamp holder 6 with respect to the first embodiment. In addition, an effect equivalent to that of the first embodiment is obtained by controlling the fan rotational speeds such that the flow speed of cooling airflow 13a is faster than cooling airflow 13b.

Figure 14:
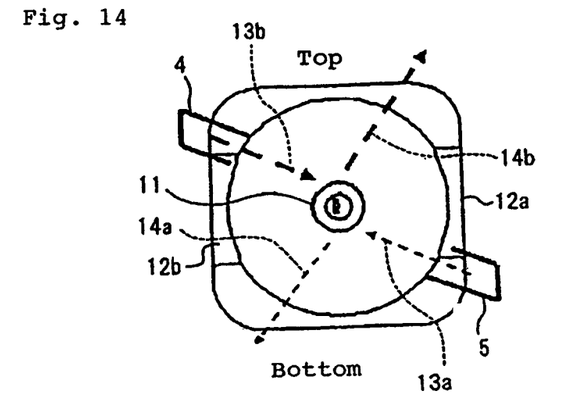
FIG. 14 is a front view of the lamp unit and is shown to explain the relation between the arc tube and the airflow outlets in the two ventilation ducts as a modification of the third embodiment.

In the example of FIG. 14, the directions of blowing the cooling airflows against the top portion and bottom portion of arc tube 11 are reversed from the configuration of FIG. 13 by left-side ventilation duct 4 and right-side ventilation duct 5. In other words, ventilation duct 5 is arranged below the lower portion of right-side cutout 12a of reflector 12, and the airflow outlet is configured such that cooling airflow 13a is intensively blown against the bottom portion and right-side portion of arc tube 11. In addition, ventilation duct 4 is arranged above the upper portion of left-side cutout 12b of reflector 12, and the airflow outlet is configured such that cooling airflow 13b is intensively blown against the top portion and left-side portion of arc tube 11. Due to this configuration, regarding the rotational speed control of the cooling fans, cooling airflow 13b is made stronger than cooling airflow 13a.

In this example, because the directions in which cooling airflows 13a and 13b are blown against the top portion and bottom portion of the arc tube are merely the reverse of the configuration of FIG. 13, an effect equivalent to that of the example of FIG. 13 is obtained by correspondingly reversing the control of the rotational speeds of sirocco fans 2 and 3.

Figure 15:
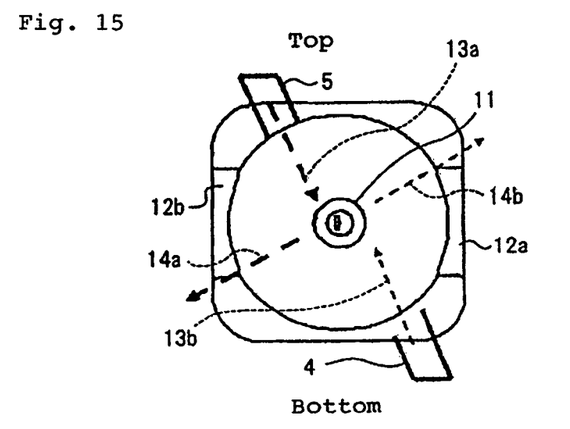
FIG. 15 is a front view of the lamp unit and is shown to explain the relation between the arc tube and the airflow outlets in the two ventilation ducts as a modification of the third embodiment.

In FIG. 15, instead of arranging the two ventilation ducts 4 and 5 to correspond to left and right cutouts 12a and 12b of reflector 12, ventilation ducts 4 and 5 are arranged at the lower right and upper left of reflector 12 and/or lamp holder 6 (not shown in FIG. 15). At upper ventilation duct 5, cooling airflow 13a from the airflow outlet is offset to the left side with respect to the center of arc tube 11, and at lower ventilation duct 4, cooling airflow 13b from the airflow outlet is offset to the right side with respect to the center of arc tube 11.

In other words, in the example of FIG. 15, cooling airflow 13a from upper ventilation duct 5 cools the top portion and left-side portion of arc tube 11, becomes exhaust airflow 14a, and is discharged from left-side cutout 12b of reflector 12. Cooling airflow 13b from lower ventilation duct 4 cools the bottom portion and right-side portion of arc tube 11, becomes exhaust airflow 14b, and is discharged from right-side cutout 12a of reflector 12. Although the positions of ventilation ducts 4 and 5 are changed from the configuration of FIG. 13, the power and effect of the cooling airflows are the same as the example of FIG. 13.

Figure 16:
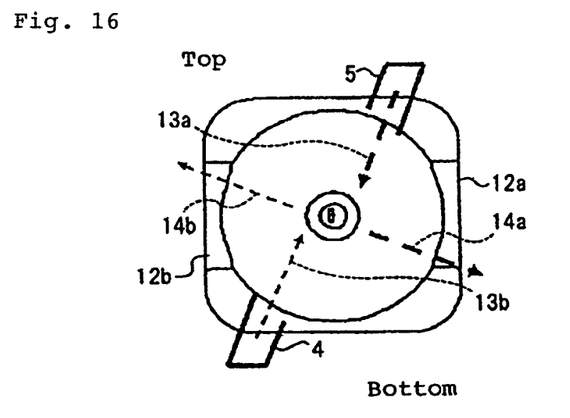
FIG. 16 is a front view of the lamp unit and is shown to explain the relation between the arc tube and the airflow outlets in the two ventilation ducts as a modification of the third embodiment.

The example of FIG. 16 is a configuration in which the positions of each of ventilation ducts 5 and 4 in FIG. 15 are changed to alter the positions of the airflow outlets. In other words, at upper ventilation duct 5 of FIG. 16, cooling airflow 13a from the airflow outlet is offset to the right side with respect to the center of arc tube 11, and at lower ventilation duct 4, cooling airflow 13b from the airflow outlet is offset to the left side with respect to the center of arc tube 11. As a result, cooling airflow 13a from ventilation duct 5 cools the top portion and right-side portion of arc tube 11, becomes exhaust airflow 14a, and is discharged from right-side cutout 12a of reflector 12. Cooling airflow 13b from ventilation duct 4 cools the bottom portion and left-side portion of arc tube 11, becomes exhaust airflow 14b, and is discharged from left-side cutout 12b of reflector 12.

Because the duct allotted to the top portion of arc tube 11 in this example is unchanged from the example of FIG. 15, the strengths of cooling airflows 13a and 13b are the same as in the example of FIG. 15. As a result, an effect equivalent to that of the example of FIG. 15 is obtained.

As shown by the examples shown in FIGS. 13-16, the directions of the airflow outlets for causing cooling airflows 13a and 13b to blow against the top portion and bottom portion of arc tube 11 are not limited to the perpendicular direction or horizontal direction of reflector 12 (the vertical or horizontal direction of the figure). In other words, the airflow outlets may be directed in any direction as long as the two cooling airflows 13a and 13b are directed against the top portion and bottom portion of arc tube 11.

Although the configurations that have been shown in the above-described first to third embodiments are examples applied to a mirror-type, ultra-short focal-distance projector, the light-source cooling device of the present invention can be used not only in a mirror-type, ultra-short focal-distance projector but also in lens-types and mirror-and-lens hybrid configurations as well. In addition, the present invention can also be applied when liquid crystal display elements or DMDs are adopted as the display elements of the projector. Essentially, the present invention can be applied in any projection display device that uses a light source such as an ultra-high-pressure mercury lamp.

Although the invention of the present application has been described with reference to embodiments, the invention of the present application is not limited to the above-described embodiments. The form or details of the invention of the present application are open to various modifications within the technical scope of the present invention that will be understood by one of ordinary skill in the art.

This application claims priority based on JP-A-2007-301521 for which application was submitted on Nov. 21, 2007 and incorporates all of the disclosures of that application.

What is claimed is:

1. A light-source cooling device for cooling a lamp unit that includes an arc tube and a reflector for reflecting light generated from said arc tube, said light-source cooling device comprising:

two airflow guide units for guiding cooling airflows to said are tube; and fans for impelling said cooling airflows toward said two airflow guide units, wherein airflow outlets of said two airflow guide units are arranged at opposite directions of said reflector with openings of the airflow outlets of said two airflow guide units facing each other, wherein a first airflow outlet that comprises one of said two airflow guide units is configured to blow said cooling airflows toward a top portion of said are tube, and a second airflow outlet that comprises another outlet of said two airflow guide units is configured to blow said cooling airflows toward a bottom portion of said are tube, wherein a center of a flow of a cooling airflow from each of said airflow outlets is shifted with respect to a center of said are tube, and wherein a speed of the cooling airflow from the first airflow outlet is more than a speed of the cooling airflow from the second airflow outlet.

2. The light-source cooling device as set forth in claim 1, further comprising two exhaust units for discharging said cooling airflows that blow against said are tube.

3. The light-source cooling device as set forth in claim 2, wherein said two exhaust units are arranged at opposite positions on said reflector.

4. The light-source cooling device as set forth in claim 1, wherein said fans are separately provided in said two airflow guide units.

5. The light-source cooling device as set forth in claim 1, wherein each said airflow guide units comprise a configuration that includes:
 a duct that is connected to an outlet of a respective one of said fans; and
 an opening that is provided in a holder to hold said reflector in order to supply a cooling airflow that has passed through said duct to said are tube.

6. The light-source cooling device as set forth in claim 1, further comprising control means for separately controlling rotational speeds of said fans,
 wherein the rotational speeds of said fans are separately controlled based on information that is set in advance.

7. A projection display device equipped with the light-source cooling device as set forth in claim 1.

8. The projection display device as set forth in claim 7, further comprising a temperature detection device for detecting a temperature outside the projection display device,
 wherein rotational speeds of said fans are separately controlled based on temperature information from said temperature detection device.

9. The projection display device as set forth in claim 7, further comprising attitude detection means for detecting an installation orientation of the projection display device,
 wherein rotational speeds of said two fans are separately controlled based on attitude information from said attitude detection means.

10. The projection display device as set forth in claim 7, further comprising temperature detection means for detecting a temperature outside the projection display device and an attitude detection means for detecting an installation orientation of the projection display device,
 wherein rotational speeds of said fans are separately controlled based on temperature information from said temperature detection means and attitude information from said attitude detection means.

11. The light-source cooling device as set forth in claim 1, wherein said top portion is defined as a portion of said are tube that faces toward a direction opposite a direction of gravity, and said bottom portion is defined as a portion of said arc tube that faces toward the direction of the gravity.

12. The light-source cooling device as set forth in claim 1, wherein said bottom portion and said top portion are defined with respect to the center of said are tube.

13. The light-source cooling device as set forth in claim 1, wherein the speed of the cooling airflow that is blown toward said top portion is controlled separately from the speed of the cooling airflow that is blown toward said bottom portion of said are tube.

14. The light-source cooling device as set forth in claim 1, wherein, with respect to the center of said are tube, a portion of said two airflow guide units is closed to said cooling airflow that is blown toward said two airflow guide units.

15. The light-source cooling device as set forth in claim 1, further comprising an attitude sensor for detecting an attitude of a projection display device that includes said light-source cooling device,
 wherein the attitude sensor detects a standing state or a suspended state of the projection display device,
 wherein, when the standing state is detected by said attitude sensor, a speed of the cooling airflow from the first airflow outlet is adjusted to be more than a speed of the cooling airflow from the second airflow outlet, and
 wherein, when the suspended state is detected by said attitude sensor, the speed of the cooling airflow from the second airflow outlet is adjusted to be more than the speed of the cooling airflow from the first airflow outlet.

* * * * *